Aug. 13, 1968  E. H. LAND  3,397,023
LIGHT APERTURES

Filed Dec. 16, 1964  2 Sheets-Sheet 1

INVENTOR
Edwin H. Land
BY Brown and Mikulka
and
Ann I. Leibowitz
ATTORNEYS

3,397,023
LIGHT APERTURES
Edwin H. Land, Cambridge, Mass., assignor to Polaroid Corporation, Cambridge, Mass., a corporation of Delaware
Filed Dec. 16, 1964, Ser. No. 418,724
11 Claims. (Cl. 350—160)

This invention relates to novel light-controlling devices comprising phototropic, or photochromic, materials and, more particularly, to novel light filters, lenses, and similar light apertures employing the same.

A primary object of this invention is to provide novel devices for transmitting light under controlled conditions.

Another object is to provide novel light filters.

Other objects of the invention will in part be obvious and will in part appear hereinafter.

The invention accordingly comprises the process involving the several steps and the relation and order of one or more of such steps with respect to each of the others, the apparatus possessing the features, properties, and the relation of components, and the product possessing the features, properties, and the relation of elements which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
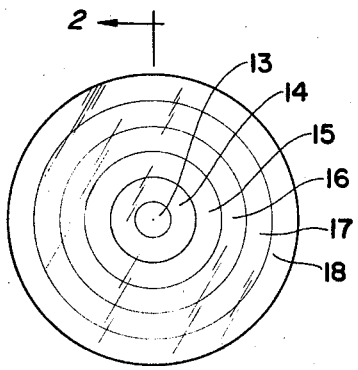
FIGURE 1 is a plan view illustrating one embodiment of this invention.

Numerous chemical substances are known to exhibit the property known as phototropism or photochromism, and may be characterized by their ability to develop or change color when exposed to light and revert to their original colorless or colored state when returned to the dark. Of particular interest are those materials which have been shown to possess this property in the solid state, that is, which need not be in liquid solution in order to exhibit photochromic changes. The present invention is directed to novel apertures which employ the photochromic phenomena of such materials.

The apertures of this invention are essentially solid translucent windows on which the photochromic materials may be coated or in which photochromic materials may be imbedded in such a way that the magnitude of the response of photochromic elements to itinerant light is a function of the distance from the center of the aperture.

In general, the apertures may be characterized in that as the intensity of itinerant light (i.e., light falling upon and entering the aperture) is increased, there is a decrease in the transmission of said light by the aperture, in particular, at the periphery of the aperture.

In a preferred embodiment of this invention, photochromic materials are arranged in or on the aperture in such a way that their sensitvity increases as a function of the distance from the center of the aperture, and light response at the center is at a minimum or even absent. This can be achieved, for example, by employing a series of different photochromic materials, each of which undergoes color change at a different light intensity. The various materials are then arranged in concentric rings around the center of the aperture, beginning at the center with a material which darkens only in the presence of relatively intense light, followed in order by concentric bands of materials which darken under progressively diminishing light intensities.

Where a photochromic material is employed which is photoresponsive only after a sensitization operation, e.g., heat, a similar aperture can be prepared from such a material by coating it on or imbedding it in the aperture prior to sensitization, and differentially sensitizing it, so that the aperture displays maximum sensitivity to light at or near its periphery, and darkness at its center only in the presence of light of a relatively high intensity. If it is desired to sensitize the materials prior to their arrangement in the aperture, the material is divided into the number of batches corresponding to the desired number of zones in the aperture, each batch is sensitized to the desired extent, and the various batches are used to prepare the aperture in the same manner as if they were dissimilar materials, as discussed above.

Where a photochromic material is employed whose sensitivity is simply a function of its concentration, apertures similar to those described above can be readily prepared by coating the material on or imbedding it in the aperture in such a way that the concentration of photo chromic elements is at a minimum or zero at the center, and increases with the distance from the center.

The aperture itself, aside from the photochromic elements, may be made of any light-transmitting material, such as glass or polystyrene, which is compatible with the selected photochromic materials.

The choice of photochromic material used to actually coat or impregnate the solid aperture will depend in part upon the compatibility of the materials with the carrier solid and in part upon the color characteristics of the photochromic compounds; when the photochromic material is applied as a coating rather than a dispersoid, compatibility of the material with the carrier generally poses no problem, the only question being one of adhesion between the respective layers. However, where the photochromic material is actually imbedded in the body of the aperture, its compatibility with the carrier must be taken into account, since ordinarily, the material must be blended with the carrier while the latter is heated to a molten state, after which the blend is allowed to harden.

Where the aperture is a filter used to control the intensity of light flowing through with no regard to wavelength, it is necessary only that the material be relatively colorless in the dark and highly colored in the presence of light. Some of the materials suitable for such applications are the inorganic photochromic compounds of mercury, titanium, tungsten, and molybdenum, and organic photochromic materials including selected anils or Schiff bases, disulphide solid solutions, hydrazones, osazones, semicarbazones, stilbene derivatives, fulgides, and spirans.

However, where the aperture is to be used as a filtering device to control the intensity of light without materially altering the wavelength, it is necessary to select a photochromic material which darkens upon exposure to light but does not take on any appreciable color or hue. For example, it has recently been found that submicroscopic silver halide crystals precipitated in glass possess phototropic properties, so that glass containing such bodies quickly darkens in the presence of light, and fades to a nearly colorless state in the absence thereof.

The use of photochromic materials in the preparation and use of the light-filtering devices of this invention will be more readily understood by reference to the drawings.

Figure 2:
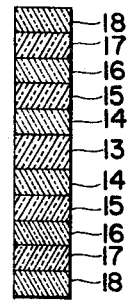
FIG. 2 is a section taken along lines 2—2 of FIGURE 1.

FIGS. 1 and 2 represent one embodiment of this invention, wherein the aperture comprises concentric zones 13, 14, 15, 16, 17 and 18, each zone having a different sensitivity, and the sensitivity of the zones increasing as a function of the distance from the center of the aperture. Thus, zone 13 may be substantially unresponsive to light, or alternatively will darken only in the presence of light of relatively high intensity, while zone 18 will exhibit maximum sensitivity and will darken in the presence of relatively low intensity light. Such a filter may be prepared, for example, by making and affixing together concentric rings or tubes of photochromic element-containing transparent solids, each ring having successively greater sensitivity to light than the one inside and adjacent to it. It will be appreciated that the number of zones in the final aperture is not critical. As will be discussed infra, the number of zones will determine in part the overall sensitivity of the aperture to itinerant light; depending upon the desired sensitivity of the aperture, the zones may vary in number from two to any practicable maximum.

Figure 3:
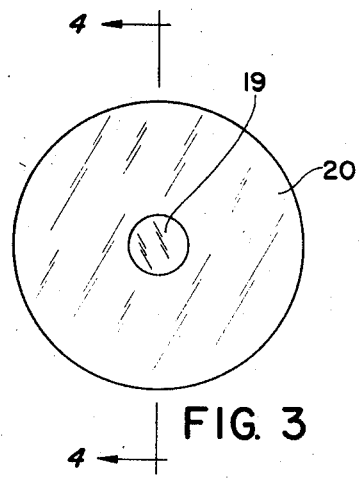
FIG. 3 is a plan view illustrating another embodiment of this invention.
Figure 4:
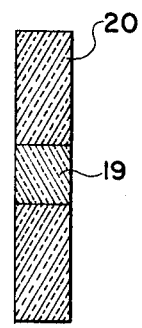
FIG. 4 is a section taken along lines 5—5 of FIG. 3.

FIGS. 3 and 4 represent still another embodiment of the filters of this invention. This filter comprises two zones 19 and 20, and is especially adapted to the use of photochromic bodies which can be dispersed in a solid in an inactive state, that is, a state in which they are unresponsive to light, but may subsequently be activated or sensitized by some external treatment, such as the application of heat. For example, it has been found that photochromic action can be controlled in certain glasses which have silver halide microcrystals dispersed throughout, by sensitizing only selected areas of the glass during manufacture. Ordinarily, when it is desired that the entire area of the glass exhibit photochromism, the glass must be heat treated during its manufacture after the introduction of silver halide microcrystals. However, by heat-treating only selected portions of the glass, those portions so treated exhibit photochromism, while the remainder of the glass does not. Thus, for the preparation of a light filter such as is shown in FIGS. 3 and 4 of the drawings, the entire filter may comprise, for example, a single piece of glass having dispersed throughout microscopic silver halide bodies, which glass has been heat treated in a temperature gradient such that the periphery of the glass, i.e., zone 20, exhibits photochromism but the central zone 19 does not.

Figure 5:
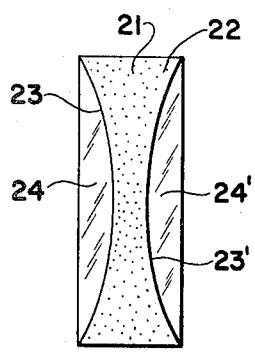
FIG. 5 is a diagrammatic cross-section view illustrating still another embodiment of this invention.

FIG. 5 represents a different embodiment of this invention, and is particularly adapted to those cases discussed above wherein the sensitivity of the photochromic material employed depends primarily on its concentration, or upon the number of photochromic bodies present throughout the path of itinerant light. As shown in FIG. 5, the filter comprises a biconcave element 21 having dispersed or imbedded throughout photochromic bodies 22. The filter is completed by affixing to each concave surface 23 and 23' of element 21 plano-convex lenses 24 and 24', each having a convex surface possessing a radius of curvature such that, together with element 21, they form a filter which does not alter the direction of itinerant light rays. Preferably, lenses 24 and 24' are made of optical glass, however, they may also be made of polystyrene or other transparent materials. Similarly, element 21 may be made of glass or other transparent solids which are compatible with the selected photochromic bodies 22. It will be apparent that together elements 24, 24' and 21 can be made of materials such that together they may comprise a no-power window. Or, if desired, the filter shown in FIG. 5 may be designed as an optical lens having any desired power by providing outer surfaces on element 24 and/or element 24' with any appropriate radius of curvature. Moreover, if it is desired to design a lens having one concave surface, surface 23 or 23' can be employed as the outer surface of the lens, omitting element 24 or 24'. Obviously, if the lens is desired to be biconcave, depending upon the selected curvature of surfaces 23 and 23', it is possible to dispense with elements 24 and 24' altogether.

Figure 6:
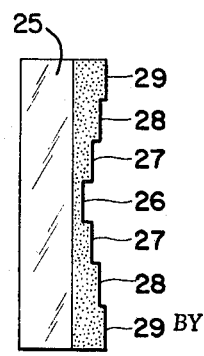
FIG. 6 is a diagrammatic cross-section view illustrating still another embodiment of this invention.

FIG. 6 represents still another embodiment of the filters of this invention, which embodiment is also adapted to photochromic materials whose sensitivity depends primarily upon concentration, and is particularly suitable for the use of photochromic materials which can readily be dispersed or dissolved in a solution and which dispersion or solution can be used as a coating on transparent bodies. The filter shown in FIG. 6 comprises a solid transparent element 25, on which coatings of photochromic materials have been applied in zones 26, 27, 28 and 29 in thicknesses which increase successively with the distance from the center of the filter. Such a filter may be made by preparing a series of solutions or dispersions of the selected photochromic materials having a range of concentrations, separately applying each solution or dispersion to the proper zone on element 25 beginning with the least concentrated solution or dispersion at the center of the filter 26, and allowing the solvent or dispersant to evaporate. Alternatively, a single solution or dispersion may be prepared at a given concentration, and coated repeatedly in concentric layers on element 25, thereby building a coating of photochromic bodies having a minimum thickness at the center 26 of element 25 and a maximum thickness at the periphery 29. It will be appreciated that the number of zones is not critical, but will be determined in part by the desired sensitivity of the filter.

Figure 7:
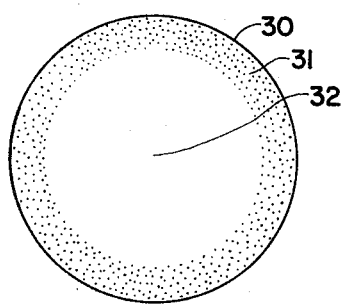
FIG. 7 is a plan view illustrating one phase of the operation of this invention, in particular, of the embodiments shown in FIGS. 1, 2, 3 and 4.
Figure 8:
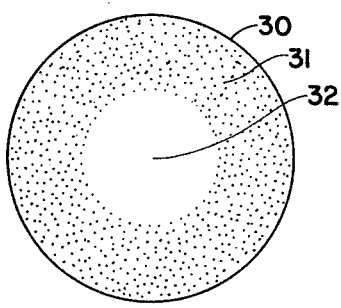
FIG. 8 is a plan view illustrating a second phase of the operation of the same embodiments of this invention.
Figure 9:
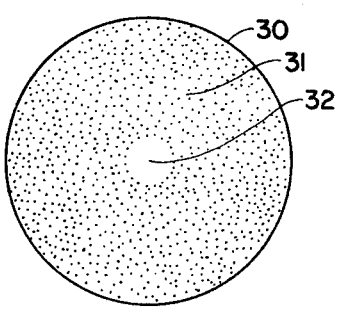
FIG. 9 is a plan view illustrating a third phase of the operation of the same embodiments of this invention.

The operation of the novel apertures of this invention described may readily be understood by considering FIGS. 7, 8 and 9, showing various phases in their use. FIG. 7 shows the appearance of the aforesaid apertures when light of relatively low intensity is passing through. Although photochromic bodies are present substantially throughout the entire body of the aperture, or, in the alternative, over its entire surface, those bodies having a maximum sensitivity to light, either by virtue of their chemical nature or concentration, are present only at or near the periphery of the aperture; those bodies having minimum sensitivity are present only at or near the center of the aperture, and bodies having intermediate sensitivity are present between the two aforementioned areas. Thus, when the itinerant light is of relatively low intensity, only those bodies at or near the periphery of the aperture will be affected, i.e., darkened. Hence, referring to FIG. 7, the area 30 at and near the periphery of the aperture will be darkened so as to exclude light; the remaining areas 31 and 32 of the aperture remain substantially transparent.

Referring to FIG. 8, when the intensity of itinerant light is increased, the photochromic bodies distributed in intermediate zone 31 and having intermediate sensitivity will also be darkened, the photochromic bodies in zone 30 remaining dark, and the central portion 32 of the aperture remaining still unaffected. Thus, the total darkened area of the aperture is seen to increase, thereby rendering the aperture capable of excluding more light than was the case in the stage shown in FIG. 7.

Referring to FIG. 9, when the intensity of the itinerant light is relatively great, all of the photochromic bodies distributed in or on the aperture are affected, including those of central zone 32 which have minimum sensitivity. Thus, itinerent light may be substantially excluded by the aperture, or, in the case where there are no photochromic bodies in the center 32 of the aperture or an insufficient number of such bodies to totally exclude light, light passes only through this zone, while it is excluded by the rest of the aperture.

Thus, the operation of the aperture in the foregoing embodiments can be likened to that of the iris of an eye, "opening" to admit light in the presence of low light intensity, and "closing down" to screen out light in the presence of greater light intensity.

In addition to the foregoing embodiments, it is also within the scope of this invention to provide apertures having photochromic bodies imbedded therein or coated thereon whose simple concentration but not sensitivity increases as a function of the distance from the center of the aperture. Any of the aforementioned photochromic bodies whose sensitivity depends upon some factor other than simple concentration are suitable for such a purpose. Such apertures may be prepared in a manner substantially identical to that of the apertures wherein the sensitivity varies with the distance from the aperture center. For example, such an aperture may be prepared exactly as shown in FIGS. 1 and 2, except that zones 13, 14, 15, 16, 17 and 18 of the aperture described therein comprise areas of increasing concentration of the same photochromic material. The embodiments shown in FIGS. 5 and 6 are similarly equally adaptable to such apertures.

Figure 10:
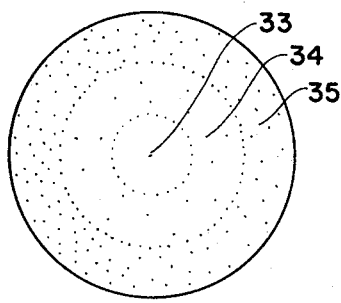
FIG. 10 is a plan view illustrating one phase of the operation of this invention, in particular, of the embodiments shown in FIGS. 5 and 6.
Figure 11:
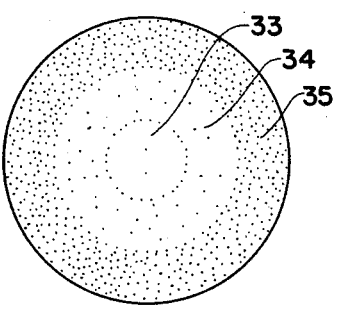
FIG. 11 is a plan view illustrating a second phase of the operation of the same embodiments of this invention.
Figure 12:
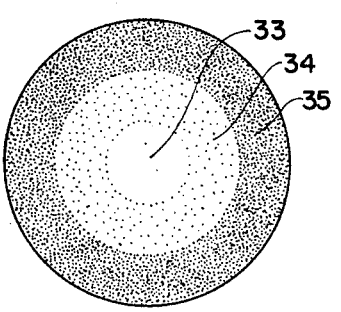
FIG. 12 is a plan view illustrating a third phase of the operation of the same embodiments of this invention.

The operation of the last-described apertures in the presence of light of varying intensity differs from the iris-like action of the first-described embodiments, and may be readily understood, by referring to FIGS. 10, 11 and 12. FIG. 10 shows the appearance of an aperture containing photochromic materials, the concentration of which is a function of the distance from the center of the aperture, in the presence of itinerant light having a relatively low intensity. In this embodiment, zone 33 has a minimal concentration of photochromic bodies, zone 34 has an intermediate concentration, and zone 35 has a relatively high concentration. In the presence of low intensity light, it is obvious that the effect upon the photochromic bodies throughout the aperture will be the same; however, the concentrations of zones 34 and 35 are such that in the presence of low intensity light, only some of the photochromic bodies will undergo color change. The aperture, therefore, is uniformly darkened, but to a relatively low extent. It is thus capable of screening out a portion of the itinerant light.

FIG. 11 shows the appearance of such an aperture in the presence if itinerant light which has been increased to medium intensity. The photochromic bodies contained in zone 33 have already been darkened to their maximum capability, and hence undergo no further change. However, the photochromic bodies of zone 34 which had been unaffected by low-intensity light now have undergone a darkening, and more of the photochromic bodies in zone 35 are similarly darkened. The gross appearance of the aperture is thus of two zones, a central zone 33 which exhibits a relatively low degree of darkening, and an outer area comprising zones 34 and 35, which is darkened to a greater extent. The aperture is thus capable of excluding more light than was the case in FIG. 10.

FIG. 12 shows the appearance of such an aperture in the presence of itinerant light of relatively high intensity, All of the photochromic bodies contained in each zone of the aperture have now undergone color change, with the result that there are three zones, 33, 34 and 35, having respectively increasing density. The aperture is thus capable of excluding more light than was the case in FIGS. 10 and 11.

It can thus be seen that the embodiments of this invention in which the concentration of photochromic bodies varies as a function of distance from the aperture center and whose operation is exemplified by FIGS. 10, 11 and 12, comprise light valves or filters which are self adjusting in the presence of itinerant light of varying intensity.

As may be seen from the foregoing description, the total number of zones of varying sensitivity and/or concentration of photochromic bodies in any of the foregoing embodiments is not critical. Where only simple or gross control of itinerant light is desired, two zones, one having a relatively high and the other a relatively low concentration of photochromic bodies, are sufficient. However, where greater control is desired, the total number of zones may be increased to any practicable number; in embodiments such as that shown in FIGURE 1, it can be seen that the actual number of "zones" is infinite.

It will obvious that the novel apertures of this invention can be put to a variety of uses, particularly in photographic applications. For example, they can be used as light filtering devices to be removably superimposed on a camera lens. The apertures can also be placed in the viewfinder of a camera to serve as a simple light metering device. Thus, for example, where the viewfinder of a camera comprises an aperture for the entry of a light beam and an optical system for directing the beam to an observation window, when a filter of the type described in this invention is included in said aperture, the difference in light coming through the observation window when illumination is correct and when illumination is in excess for proper exposure of the film can be used to inform the photographer of the correctness of his exposure settings on the camera.

Additionally, the apertures of this invention in which the light sensitivity is a function of distance from the center may be made a permanent part of the optical system of a camera, thereby effectively and permanently controlling the amount of light which is transmitted to the film. A device so installed may provide means for maintaining a uniform maximum transmission of light to the photosensitive elements within the camera, regardless of the intensity of the incident light. Moreover, if the aperture is constructed as a lens such as that shown in FIGURE 1, it can be made to have any desired power, and can thus function per se as the camera lens having a built-in light control.

Since certain changes may be made in the above devices and different embodiments of the invention could be made without departing from the scope thereof, it is intended that all matter contained in the above description or shown in the accompanying drawings shall be interpreted as illustrative and not in a limiting sense.

What is claimed is:

1. A light-filtering device comprising a solid, transparent element having in conjunction therewith photochromic bodies distributed in a plurality of concentric zones, the magnitude of the response of said photochromic bodies to itinerant light in each respective zone increasing as a function of the distance of said zone from the center of said element.

2. A light-filtering device as described in claim 1 wherein said photochromic bodies are dispersed within said solid, transparent element.

3. A light-filtering device as described in claim 1 wherein said photochromic bodies are coated on a surface of said solid, transparent element.

4. An aperture comprising a solid, transparent element having in conjunction therewith photochromic bodies distributed in a plurality of concentric zones, the concentration of said photochromic bodies in each respective zone increasing as a function of the distance of said zone from the center of the element.

5. An aperture as described in claim 4 wherein said photochromic bodies are dispersed within said solid, transparent element.

6. An aperture as described in claim 4 wherein said photochromic bodies are on a surface of said solid, transparent element.

7. A light-filtering device comprising a biconcave, solid, transparent lens having photochromic bodies evenly distributed throughout, a first plano-convex transparent, solid lens having a radius of curvature corresponding to that of one face of said biconcave lens and a second plano-convex solid, transparent lens having a radius of curvature corresponding to the remaining face of said biconcave lens, both of said plano-convex lenses being affixed to said biconcave lens at the matching surfaces so as to produce a no-power light filter.

8. An optical element comprising a light-transmitting device having a plurality of transparent zones, each zone having photochromic bodies associated therewith, the sensitivity of said photochromic bodies in each respective zone increasing as a function of the distance of said zone from the center of the element.

9. An optical element as described in claim 5 wherein said photochromic bodies are dispersed within said transparent zones.

10. An optical element as described in claim 5 wherein said photochromic bodies are coated on a surface of said transparent zones.

11. A light-controlling optical lens comprising a biconcave, solid, transparent lens having photochromic bodies evenly distributed throughout, said photochromic bodies being characterized in that their ability to respond to light is a function of their number in the path of said light, and at least one transparent, solid lens having at least one convex surface the radius of curvature of which corresponds to that of one face of said biconcave lens and being affixed to said biconcave lens at the matching surfaces.

No references cited.

JEWELL H. PEDERSEN, *Primary Examiner.*

W. L. SIKES, *Assistant Examiner.*